US010113709B2

(12) United States Patent
Ebner

(10) Patent No.: US 10,113,709 B2
(45) Date of Patent: Oct. 30, 2018

(54) ELONGATE MULTIPARTITE LENS ARRANGEMENT AND LUMINAIRE COMPRISING SUCH A LENS ARRANGEMENT

(71) Applicant: ZUMTOBEL LIGHTING GMBH, Dornbirn (AT)

(72) Inventor: Stephan Ebner, Dornbirn (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 111 days.

(21) Appl. No.: 15/117,599

(22) PCT Filed: Feb. 10, 2015

(86) PCT No.: PCT/EP2015/052734
§ 371 (c)(1),
(2) Date: Aug. 9, 2016

(87) PCT Pub. No.: WO2015/121243
PCT Pub. Date: Aug. 20, 2015

(65) Prior Publication Data
US 2016/0356452 A1 Dec. 8, 2016

(30) Foreign Application Priority Data

Feb. 11, 2014 (DE) .................. 10 2014 202 461

(51) Int. Cl.
*F21S 4/00* (2016.01)
*F21V 5/04* (2006.01)
(Continued)

(52) U.S. Cl.
CPC .............. *F21V 5/045* (2013.01); *F21V 5/008* (2013.01); *F21V 7/005* (2013.01); *F21V 7/0091* (2013.01);
(Continued)

(58) Field of Classification Search
CPC ...... F21V 5/045; F21V 19/0035; F21V 15/01; G02B 17/006
See application file for complete search history.

(56) References Cited

U.S. PATENT DOCUMENTS 7,431,481 B2   10/2008   Stefanov
8,070,329 B1   12/2011   Bechtel et al.
(Continued)

FOREIGN PATENT DOCUMENTS

CA       2785201 A1      2/2014
DE   202012100508 U1     5/2013
(Continued)

OTHER PUBLICATIONS

English translation of Zumtobel EP 2629001, May 17, 2013.*
(Continued)

*Primary Examiner* — Evan Dzierzynski
(74) *Attorney, Agent, or Firm* — Brooks Kushman P.C.

(57) ABSTRACT

An elongate multipartite lens arrangement for luminaires for influencing light emitted by an illuminant including a first elongate optical element having a first longitudinal axis and at least one second elongate optical element having a second longitudinal axis which is disposed downstream of the first optical element in the light guiding direction and is separate from the first optical element, wherein at least the first optical element has at least one defined light entrance region provided along the first longitudinal axis and serving for introducing light from the illuminant into the lens arrangement, and wherein the second optical element, for the light guiding of the lens arrangement, interacts optically with the first optical element in order to continue the light guiding of the first optical element. A luminaire, including a multiplicity of illuminants and an elongate multipartite lens arrangement is also disclosed.

15 Claims, 6 Drawing Sheets

Figure 1:
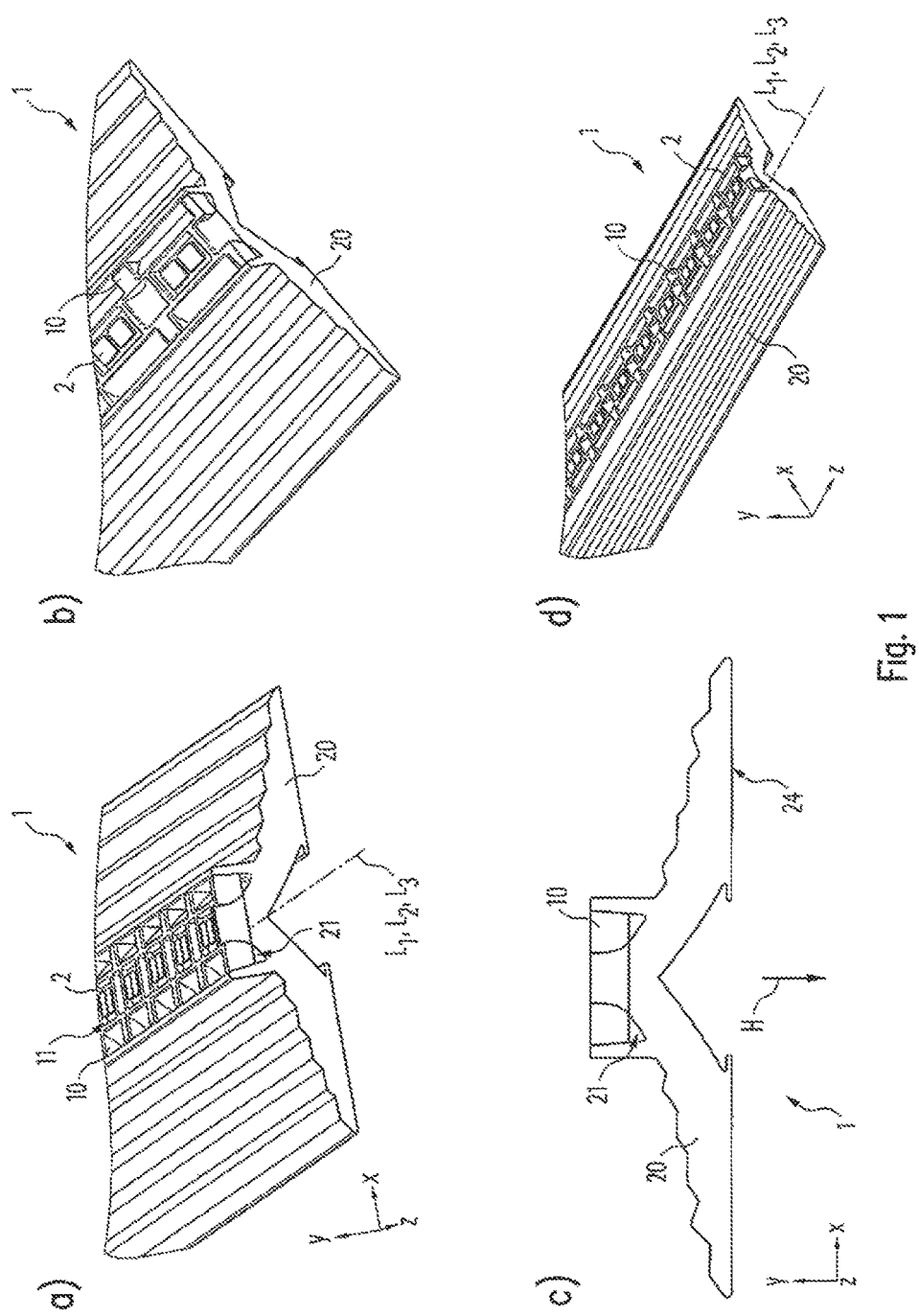

(51) Int. Cl.
  *F21V 5/00*  (2018.01)
  *F21V 7/00*  (2006.01)
  *F21V 13/02*  (2006.01)
  *F21V 13/04*  (2006.01)
  *F21V 15/01*  (2006.01)
  *F21V 17/18*  (2006.01)
  *F21V 19/00*  (2006.01)
  *G02B 17/00*  (2006.01)
  *G02B 19/00*  (2006.01)
  *F21Y 103/10*  (2016.01)
  *F21Y 115/10*  (2016.01)

(52) U.S. Cl.
  CPC .............. *F21V 13/02* (2013.01); *F21V 13/04* (2013.01); *F21V 15/01* (2013.01); *F21V 17/18* (2013.01); *F21V 19/0035* (2013.01); *G02B 17/006* (2013.01); *F21Y 2103/10* (2016.08); *F21Y 2115/10* (2016.08); *G02B 19/0028* (2013.01); *G02B 19/0066* (2013.01)

(56) References Cited

U.S. PATENT DOCUMENTS

2007/0076427 A1  4/2007  Reo et al.
2010/0097809 A1*  4/2010  Munro ..................... F21V 5/04
                     362/308
2012/0057353 A1  3/2012  Wei
2013/0003363 A1*  1/2013  Lu ..................... G02B 19/0066
                     362/217.02

FOREIGN PATENT DOCUMENTS

| | | | |
|---|---|---|---|
| EP | 1684002 A2 | | 7/2006 |
| EP | 2629001 | * | 8/2013 |
| EP | 2629001 A1 | | 8/2013 |
| WO | 2007061222 A1 | | 5/2007 |
| WO | 2010053528 A2 | | 5/2010 |

OTHER PUBLICATIONS

International Search Report for PCT/EP2015/052734, English Translation attached to original, Both Completed by the European Patent Office dated Mar. 16, 2015, all together 7 pages.

Search Report for German Application No. DE 102014202461.7, Completed by the German Patent Office, dated Nov. 28, 2014, 7 pages.

* cited by examiner

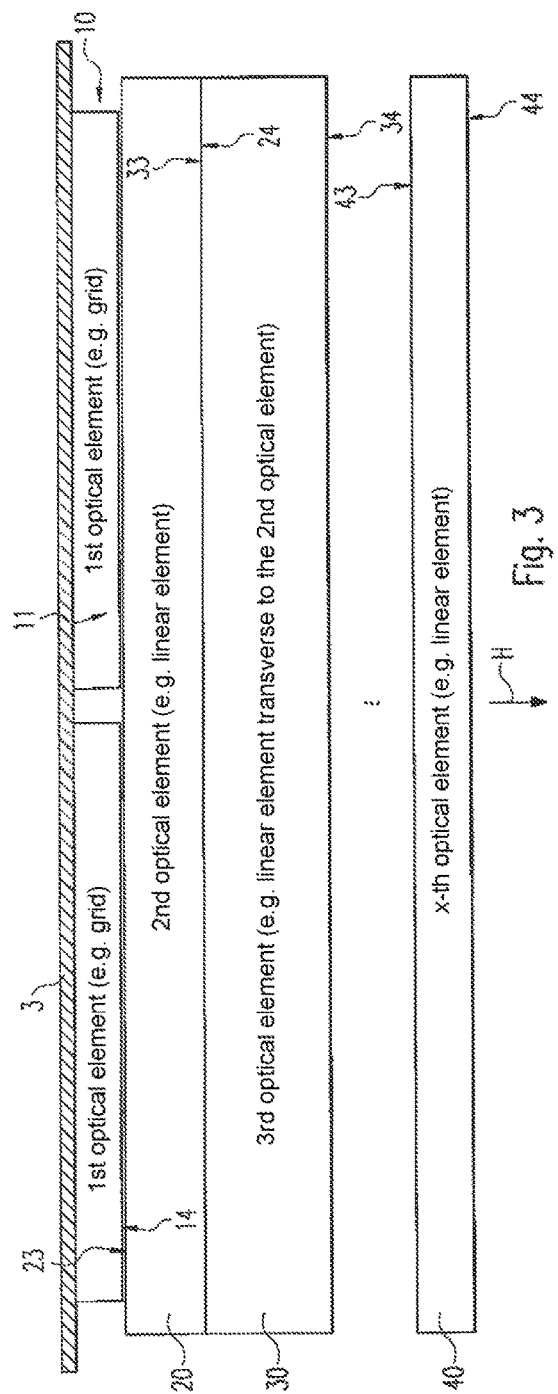
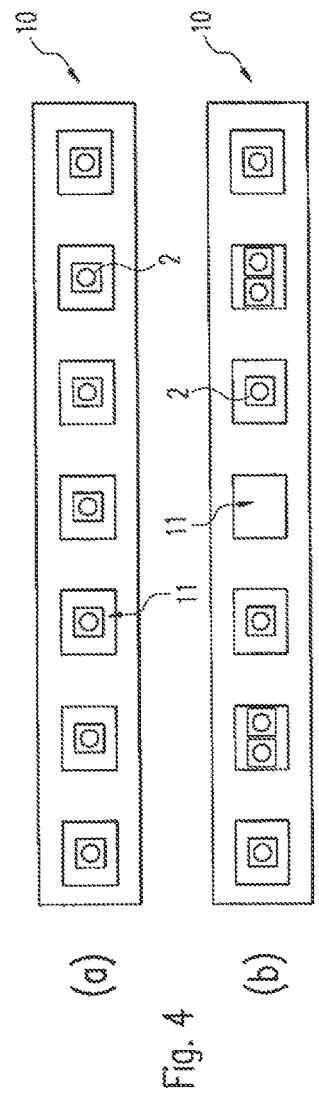
Fig. 3
Fig. 4

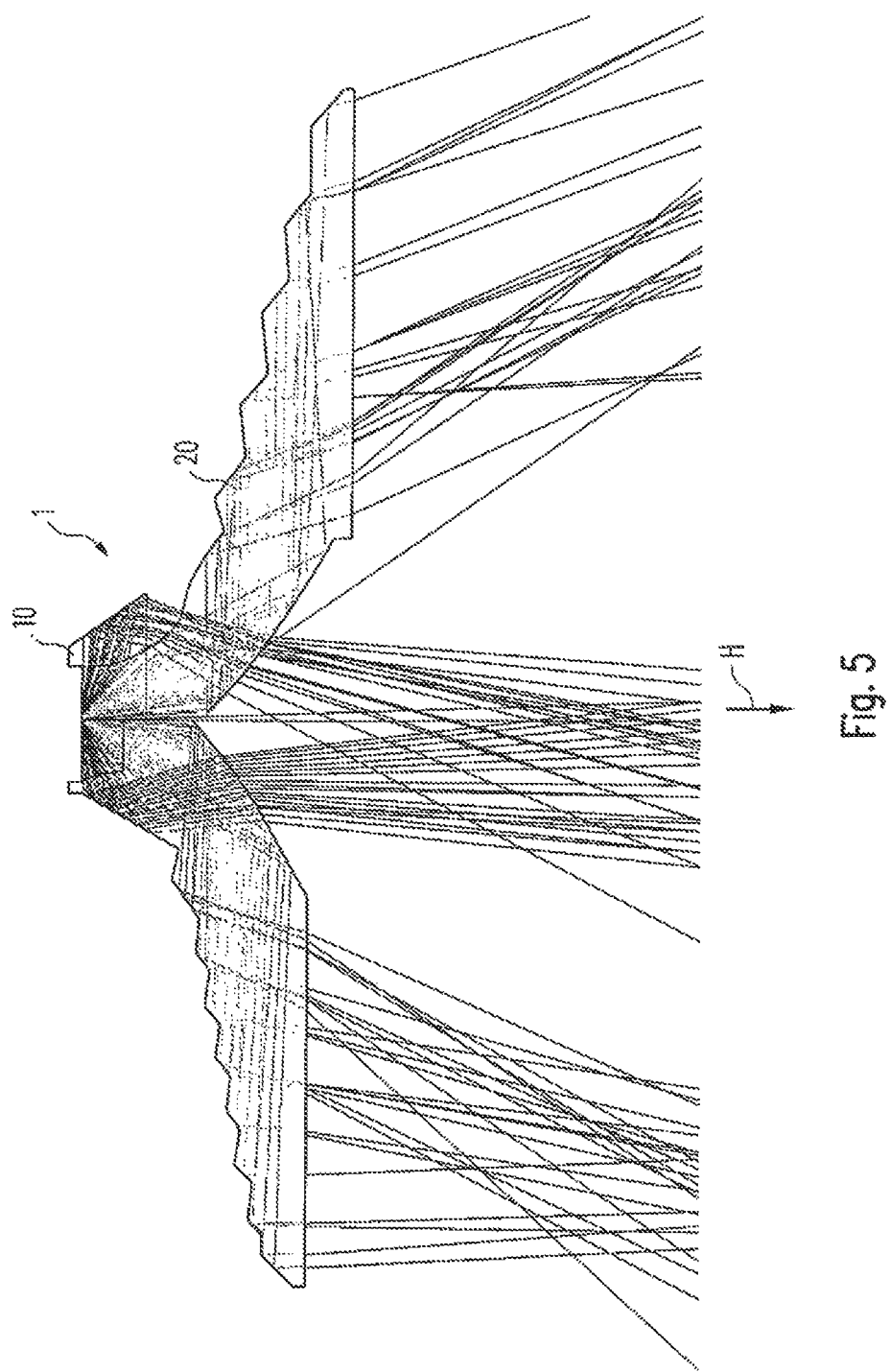

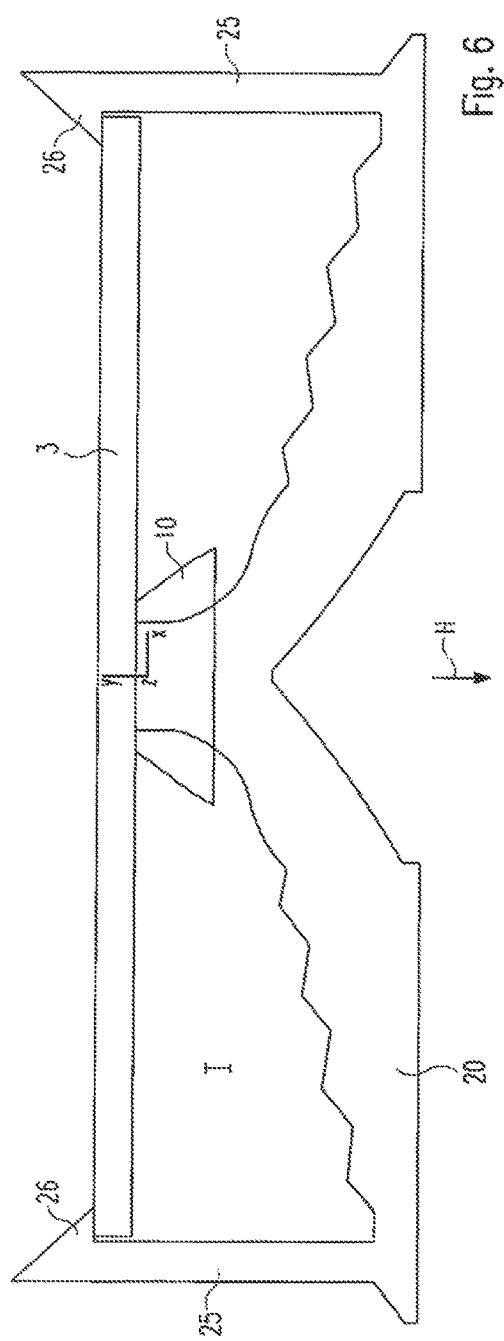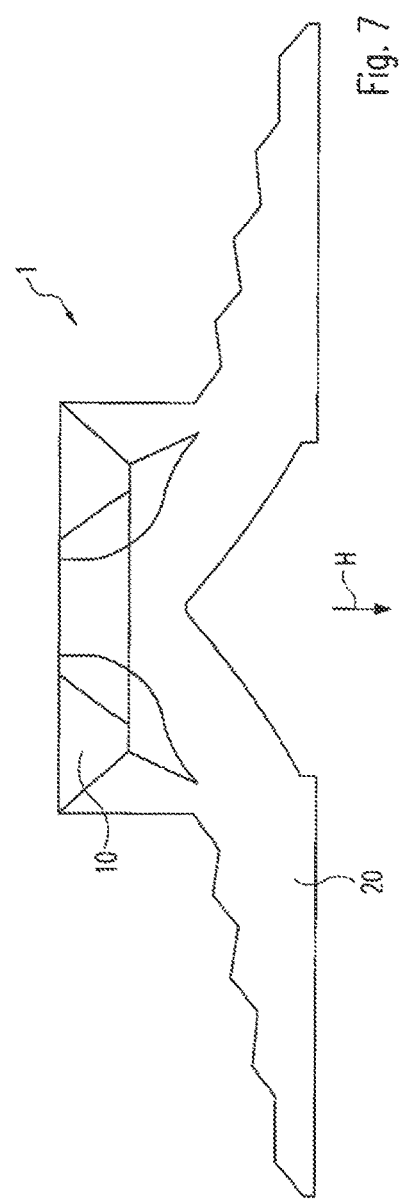

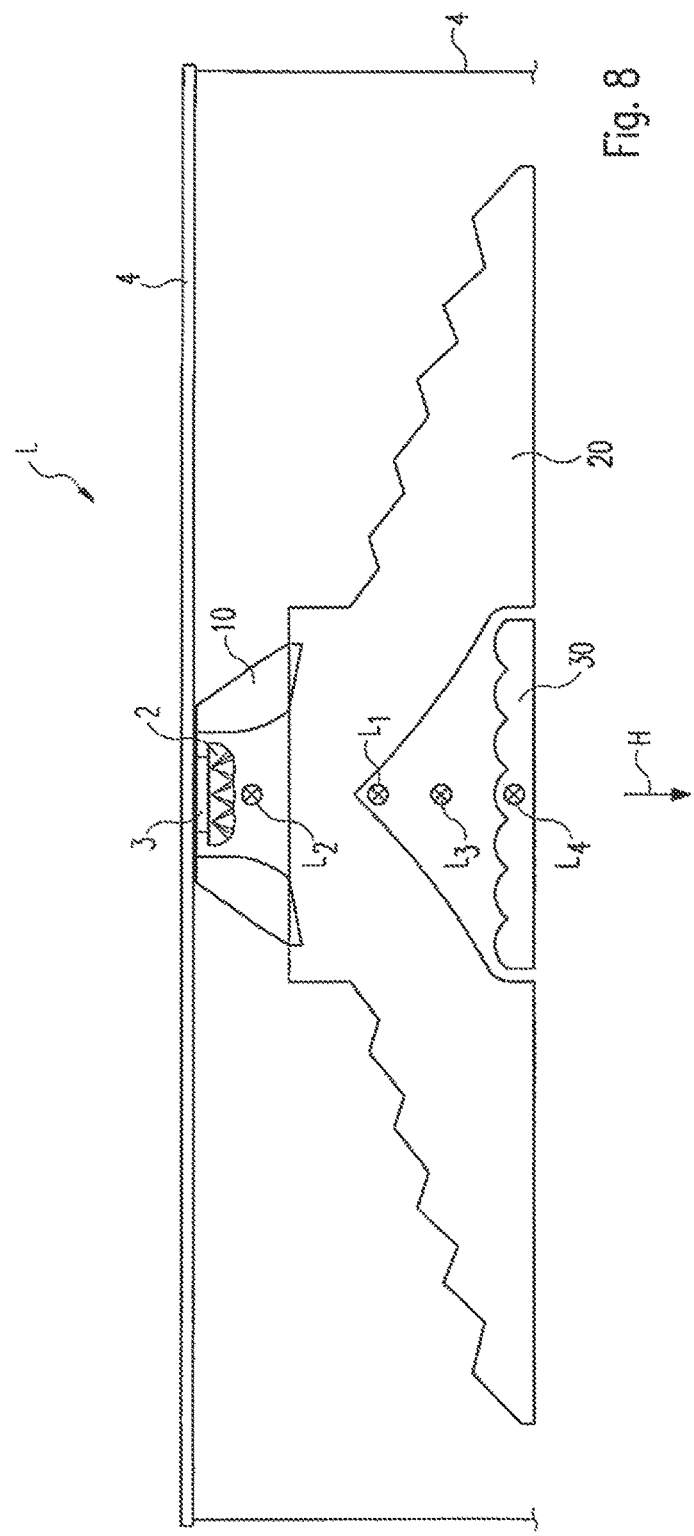

ELONGATE MULTIPARTITE LENS ARRANGEMENT AND LUMINAIRE COMPRISING SUCH A LENS ARRANGEMENT

CROSS-REFERENCE TO RELATED APPLICATION

This application is the U.S. national phase of PCT Application No. PCT/EP2015/052734 filed on Feb. 10, 2015, which claims priority to DE Patent Application No. 10 2014 202 461.7 filed on Feb. 11, 2014, the disclosures of which are incorporated in their entirety by reference herein.

The present invention relates to an elongate multipartite lens arrangement for luminaires for influencing light emitted by an illuminant, and a corresponding luminaire comprising such a lens arrangement.

Elongate lens arrangements, which are many times longer than the width thereof and which therefore can be employed in elongate luminaires, are known from the prior art. By way of example, if these have discrete lenses or lens elements or lens regions, they are also adequately referred to as lens arrays. Such lens arrays usually have a single-piece design, which is accompanied by the disadvantage that the linear thermal expansion of this arrangement increases with increasing length of such a lens arrangement (e.g. >400 mm). This can lead to problems in the case of a typical application temperature range from −30° C. (e.g. in cold storage and/or in northern countries) to above +40° C. (e.g. in industrial buildings and/or in warm climatic regions, like in Africa or Arab countries). A reason for this is that, inter alia, the linear thermal expansion coefficient of metal (used e.g. for the, or in the, printed circuit board receiving the illuminants or the housing of the luminaire) is many times higher than the linear thermal expansion coefficient of plastics (such as e.g. the plastic used for the lens arrangement, generally PMMA or PC). Firstly, this harbors the risk of a mechanical collision between illuminants and optical unit, which may lead to damage of the luminaire system. Secondly, as a result of a correspondingly large temperature difference in the different application regions (Δt up to 70° C. and more), there can be a permanent and negative change in the emission characteristic due to the differently long lens arrangements and the different positions of the individual lens elements in relation to the illuminants resulting therefrom.

It is therefore an object of the present invention to provide elongate lens arrangements and luminaires equipped therewith, which overcome the disadvantages referred to above and, moreover, can be used in a flexible and safe manner.

The subject matter of the present invention is determined by the independent claims. The dependent claims advantageously develop the central concept of the invention in a particularly advantageous manner.

In accordance with a first aspect, the present invention relates to an elongate multipartite lens arrangement for luminaires for influencing light emitted by an illuminant. To this end, the lens arrangement comprises a first elongate optical element (also referred to as first (optical) element below) comprising a first longitudinal axis and at least one second elongate optical element (also referred to as second (optical) element below) comprising a second longitudinal axis, which second elongate optical element is disposed downstream of the first optical element in the light-guiding direction and provided separately from the first optical element. At least the first optical element has at least one defined light-entrance region, provided or arranged or embodied along the first longitudinal axis, for introducing light of the illuminant into the lens arrangement. Thus, in addition to the first element, the second element (or further optical elements yet to be described below) can also have corresponding light-entrance regions. Moreover, the light-entrance region can be embodied continuously over (the whole length) of the optical element or it can have (discrete) light-entrance regions arranged along the longitudinal axis. By way of example, the light-entrance regions can therefore be arranged or embodied along the longitudinal axis of the first optical element in one row or else in a plurality of rows, or else in combination with individually assigned light-entrance regions. The second optical element, for the purposes of guiding light of the lens arrangement, optically interacts with the first optical element in order to continue the light guidance of the first optical element. If the lens arrangement only has two optical elements, the second optical element also terminates the light guidance of the lens arrangement and serves to emit the light, preferably in a main emission direction of the lens arrangement.

As already mentioned, in addition to the first two optical elements, the lens arrangement can furthermore comprise one or more further elongate optical elements, which are disposed downstream at least of the first optical element in the light-guiding direction and provided separately from the first optical element. Here, the further optical elements optically interact with the first optical element, preferably with the second optical element and optionally also other further optical elements, for light-guiding purposes in order to obtain a desired, closed light guidance of the lens arrangement.

Consequently, the lens arrangement in accordance with the present invention is composed of at least two or more stacked and mechanically separated elements which are optically matched to one another. Since the respective optical elements have different objects, as will be described below, they can be provided in a proportion deviating from a 1:1 relationship. The second optical element and the further optical elements are stacked onto the first optical element or elements, wherein the optical elements disposed downstream of the first element in the light-guiding direction continue the light guidance of the first optical element, wherein the last element or elements as seen in the light-guiding direction terminates/terminate the light guidance and consequently emits/emit the light by way of the light emission region. Depending on application, the stack of more than two different optical elements can be combined as required.

As a result of the multi-stage and, in particular, multipartite embodiment of the lens arrangement according to the invention, it is also possible, in particular, for large and, above all, long lens arrangements to be embodied in such a way that the thermal influences on the optical unit are minimized. Consequently, a risk of collision between illuminants and optical unit can be reduced and the emission characteristic can be stabilized for certain temperature limits.

It is likewise possible to realize more complex optical geometries by way of the different stages of the optical unit, which more complex optical geometries cannot, for example, be produced by single-stage—i.e. one piece—optical units since they cannot be demolded in that case.

Likewise, the lens arrangement according to the invention renders it possible only to replace one or a few of the stages of the lens arrangement—i.e. only one optical element or a few optical elements; preferably only the first optical element—during the adaptation to newer and more efficient illuminants. This is significantly more cost-effective in relation to the replacement of the entire lens arrangement with a completely new optical unit.

Longitudinal axes of the optical elements, preferably at least of the first optical element and the second optical element, can preferably be aligned parallel to one another. Additionally, or alternatively, it is also conceivable for at least one of the longitudinal axes, preferably one of the longitudinal axes of the further optical elements, to be aligned obliquely or transversely by a predetermined angle in relation to the other longitudinal axis or axes in a plane perpendicular to a main emission direction of the lens arrangement (i.e. in the plane of main extent of the lens arrangement or of the optical elements). In other words, the optical elements can be combined with one another as required, depending on application and desired emission characteristic.

The light-entrance region can be embodied as a recess in order thus to serve for a defined reception of the illuminants.

Preferably, the first optical element can have a grid or lattice forming the light-entrance regions. Alternatively, or additionally, the light-entrance regions can also be arranged in the form of a grid or lattice. Thus, the light-entrance regions are arranged or embodied in one or more rows along the longitudinal axis. Then, at least one illuminant is assignable to each light-entrance region or grid or lattice element.

The light-entrance regions or lattice or grid elements are preferably embodied as optical light-influencing elements, in particular as lenses, or have corresponding (discrete) light-influencing elements.

By embodying the first optical element, in particular, as, or in the form of, a lattice or grid, it is possible to provide discrete or selective lens regions. Furthermore, the lattice or grid elements can consist of optical prism or lens elements or the optical element can provide discrete lenses or lens regions, which are preferably directly matched to the number of employed illuminants (e.g. light-emitting diodes; LEDs). In this case, the number of light-entrance regions or lattice or grid elements is dependent on the number of employed illuminants. In this case, at least one illuminant is assigned to each light-entrance region or lattice or grid element. In special applications, individual light-entrance regions or lattice or grid elements can also remain empty, and so it is not only uniform equipment of the optical element with the illuminants respectively associated with the light-entrance regions which is possible; instead, alternatively no, one or more illuminants can be assigned to the light-entrance regions in order to be selectively matched to the individual requirements of the desired emission characteristic.

The optical elements are preferably at least in part in (planar) contact with other (adjacent) optical elements in order, in particular, to easily position the optical elements in relation to one another and set these with one another. Preferably, the light-entrance regions of the second optical element and of the further optical elements—for the purposes of continuing the light guidance of the first optical element and further optical elements correspondingly disposed upstream in the light-guiding direction—can be at least partly in preferably planar contact with light-exit regions of at least one of the optical elements disposed upstream thereof in the light-guiding direction.

In accordance with one preferred embodiment, the optical elements can have connection elements, which correspond mechanically to one another (i.e. are matched to the respective optical adjacent elements), for defined connecting and positioning of the optical elements in relation to one another.

By way of example, the connection elements can have rails for a sliding bringing-together of the optical elements or comparable guides. Additionally, or alternatively, studs, pins and the like and respectively corresponding receiving elements can also be provided as connection elements. In this way, the individual stages of the lens arrangement or of the optical lens stack can be sensibly positioned in relation to one another since the corresponding connection elements enable a defined alignment and a secure hold of the individual stages. The type and the embodiment of the corresponding connection elements in this case depends on the way the respective elements were produced and can therefore be selected as required.

At least one of the optical elements, preferably at least the second optical element, can have a recess which extends in the longitudinal direction of the optical element—preferably over the whole length thereof—for receiving a further optical element, preferably the first optical element.

At least one optical element, preferably the last optical element in the light-guiding direction, can have a protection element, preferably embodied integrally with the optical element, for protecting the illuminant or a luminaire comprising the lens arrangement. Hence, it is possible to provide a protection element for protection against contamination and contact in a simple manner. Preferably, the protection element has latching elements in order automatically to interact with a corresponding latching element when the lens arrangement is assembled in order thus to mechanically connect or hold together the lens arrangement and, where applicable, further elements of a luminaire, i.e. to fix or position and align corresponding elements.

The optical elements can be embodied as linear lens elements, in particular extrusion lenses, lens arrays, in particular plates with discrete lenses or lens elements, lattice or grid elements, MPO (micro prism optical) plates or COP (cooperative optical) plates, diffractive optical units, freeform optical units, and/or as diffusely scattering plates. The selection of the respective optical unit depends, in particular, on the type of use of the lens arrangement and the desired light guiding or emission characteristic. Thus, the respective optical elements can preferably have a complex geometry when seen in a cross section. Therefore, the multipartite embodiment of the lens arrangement is particularly advantageous since, therewith, it is also possible to provide complex forms of the overall lens arrangement in a comparatively simple manner because the individual optical elements per se necessarily have a lower complexity.

In accordance with a further aspect, the invention relates to a luminaire comprising a multiplicity of illuminants and an elongate multipartite lens arrangement in accordance with the invention, wherein no, one or more illuminants are optically assigned in a defined manner to each one of the light-entrance regions.

The luminaire according to the invention can furthermore comprise a housing for receiving the illuminants and the lens arrangement, wherein the lens arrangement—preferably the last elongate optical element or elements in the light-guiding direction—form a cover of the luminaire or of the housing. Therefore, it is easily possible to provide a closed luminaire system.

Furthermore, the illuminants can be applied to a preferably elongate printed circuit board. Here, the printed circuit board can preferably extend over the whole length of the lens arrangement. The first optical element or elements can be provided directly on the printed circuit board or the housing in a detachable or non-detachable manner. The optical stages directly applied to the printed circuit board can therefore at the same time provide a type of protection against contact for the electrical components. Hence, it is possible to provide a luminaire in which the first optical stage or stages are applied directly onto the (LED) printed circuit board, while the subsequent stage or stages can serve as partial or complete cover for the luminaire.

By way of example, at least one optical element, preferably the last optical element in the light-guiding direction, can have a protection element, preferably having an integral embodiment with this optical element, for protecting the illuminants or a luminaire comprising the lens arrangement. Here, the protection element can provide, either on its own or in connection with the housing or the printed circuit board or any other element of the luminaire, a space, which is spatially closed to the outside, for the purposes of protecting the luminaire or the illuminant from contaminants or contact. In particular, the latching element can preferably interact with a corresponding latching element of the lens arrangement or of the luminaire for mechanically connecting or keeping together the lens arrangement or the luminaire.

Particularly preferably, at least one optical element, preferably the last optical element in the light-guiding direction, substantially has the same length, as seen in the direction of the longitudinal axis of the lens arrangement, as the housing or the illuminant or the printed circuit board comprising the luminaire. In this manner, it is very easily possible to provide a closed and protected optical system.

The illuminants preferably have light-emitting diodes (LEDs).

Further advantages and embodiments of the present invention are described below on the basis of the drawings of the accompanying figures.

Figure 2:
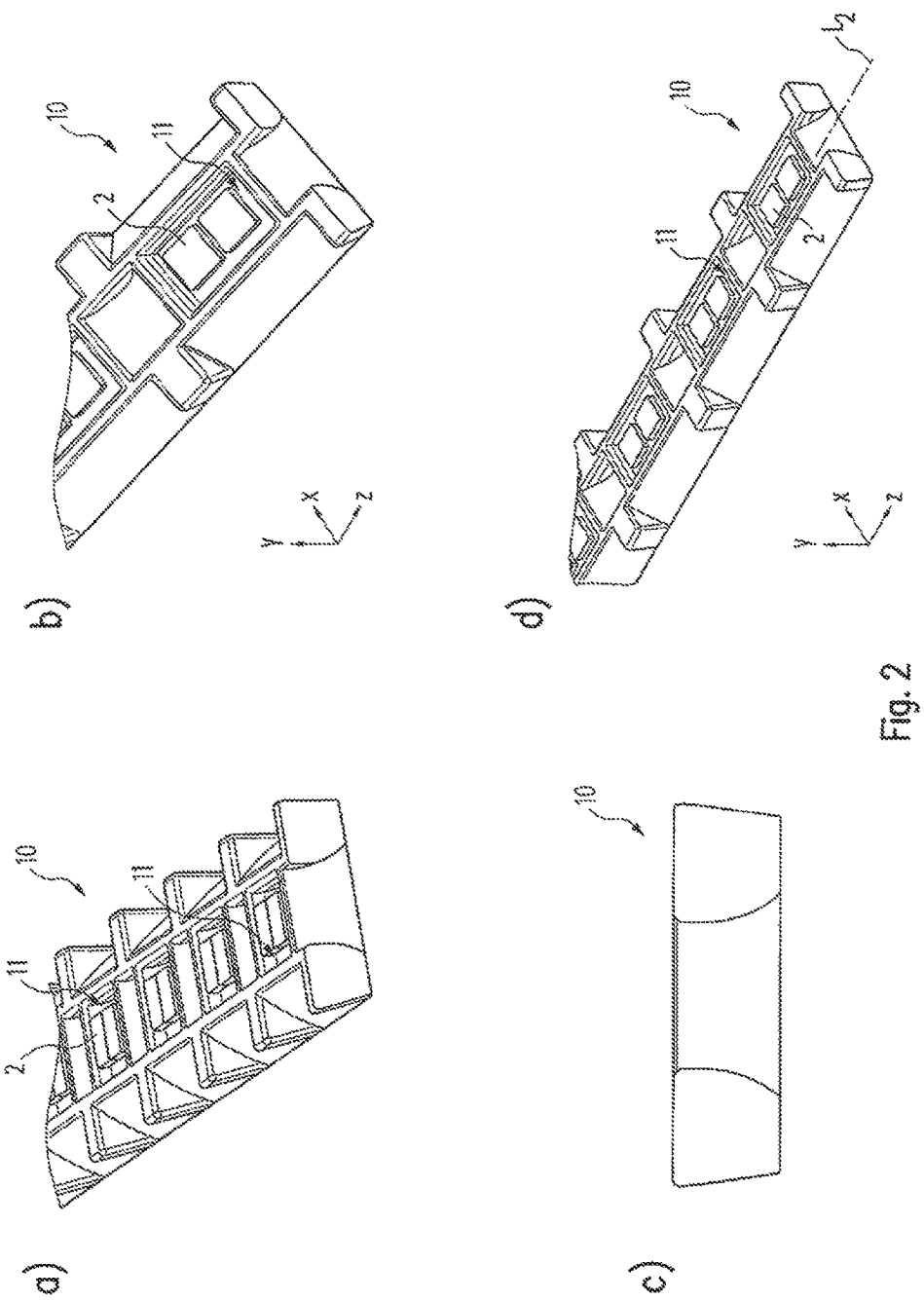

FIG. 1 shows a lens arrangement according to the invention,

FIG. 2 shows a first optical element in accordance with the lens arrangement according to the invention according to FIG. 1, FIG. 3 schematically shows the basic design of a lens arrangement in accordance with the present invention, FIG. 4 shows different variants for equipping individual optical lattice or grid elements of a first optical element in accordance with the present invention, FIG. 5 shows, on the left-hand side, a conventional single-stage split lens and, on the right-hand side, a two-stage lens arrangement (split lens) according to the invention.

FIG. 6 shows a closed lens arrangement in accordance with the present invention, FIG. 7 shows a further embodiment of the present lens arrangement according to the invention, and FIG. 8 shows a luminaire with a three-stage lens arrangement according to the invention.

FIG. 1 shows an exemplary embodiment of an elongate lens arrangement 1 according to the invention for luminaires L (see FIG. 8) for influencing light emitted by an illuminant 2. Within the scope of the invention, elongate is understood to mean that the lens arrangement 1 extending the main emission direction H substantially perpendicular to the XZ-plane shown in FIG. 1 (main plane of extent) has a many times greater length in the direction of the longitudinal axis L1 thereof than the width thereof (depicted in FIG. 1 in the direction of the X-axis). Here, as shown in FIG. 1, the lens arrangement 1 can have a substantially rectangular basic form, with the invention not being restricted thereto.

According to the invention, the elongate lens arrangement 1 has a multipartite embodiment. To this end, the elongate multipartite lens arrangement 1 has a first elongate optical element 10 comprising a longitudinal axis L2. The first optical element 10 has at least one defined light-entrance region 11, which is provided (i.e. embodied or extending or arranged) along the longitudinal axis L2 thereof, for introducing light of an illuminant 2 into the lens arrangement 1.

The light-entrance region 11 can preferably be embodied as a recess in the corresponding optical element 10—presently the first optical element—, in particular for receiving the illuminants 2. To this end, the recess can present itself as e.g. a continuous recess extending in the longitudinal direction of the first optical element 10. Alternatively, it is also conceivable for the first optical element 10 to have a grid or lattice 12, which forms the light-entrance regions 11, as depicted in e.g. FIG. 2. It is also conceivable that the light-entrance regions 11 are only arranged in the form of a grid or lattice. In any case, at least one illuminant 2 is assignable to each light-entrance region 11—or each grid or lattice element—in the case of such an embodiment, as depicted schematically in e.g. FIGS. 4a and 4b. Here, FIG. 4a shows an embodiment of the first optical element 10 in which the light-entrance regions 11 are matched to the number of employed illuminants 2. Thus, in this case, the number of lattice or grid elements 11 is dependent on the number of employed illuminants 2. However, it is also conceivable for a single illuminant 2 not to be assigned to the individual light-entrance regions 11 or the lattice of the grid elements in every case, but instead for it optionally to have no illuminant 2 or a plurality of illuminants 2 assigned thereto, as shown in FIG. 4b. Hence, special applications, in which the number and position of the illuminants 2 is accordingly freely selectable, can be generated in a simple manner, depending on the desired emission characteristic and embodiment of the lens arrangement 1. By way of example, if no lattice or grid is present, i.e. if, for example, the light-entrance region 11 of the first optical element 10 is provided as a continuous recess in the first optical element 10, the individual illuminants 2 can be positioned at any positions within this recess, which further increases the flexibility of the present lens arrangement 1.

The light-entrance regions 11 or the individual lattice or grid elements are preferably embodied as optical light-influencing elements, in particular as optical prism or lens elements. Here, some, more or all of the defined light-entrance regions 11 can be embodied in an appropriate light-influencing manner, for example in the form of a lens or other optical elements. Consequently, the grid or lattice can also be provided by lenses or lens elements provided in a defined or undefined manner as light-entrance regions 11 on the first optical element 10, the position of which light entrance regions is likewise freely selectable.

In addition to the first optical element 10, the multipartite lens arrangement 1 furthermore has at least one further, second optical element 20. This second optical element 20 also extends along a longitudinal axis L3. In respect of the first optical element 10, the second elongate optical element 20 is provided disposed downstream thereof in the light-guiding direction, with the two optical elements being provided separately, i.e. not being embodied integrally. The two optical elements 10, 20 interact for the light guidance of the lens arrangement 1 in order to continue the light guidance of the first optical element 10 by way of the second optical element 20 and terminate the light guidance in the lens arrangement 1 provided that the multipartite lens arrangement 1 overall consists of these two optical elements 10, 20 such that the light can be emitted in the main emission direction H at a light emission region 24 of the second optical element 20.

Thus, the two optical elements 10, 20 are stacked on one another for a closed light guidance. However, it is also conceivable for the multipartite lens arrangement 1 or the stack to be composed of more than two different optical elements 10, 20 which, depending on application, can be combined as desired, as depicted in an exemplary and schematic manner in FIG. 3. In this case, the lens arrangement 1 has one or more further optical elements 30, 40, each with a longitudinal axis L4, which optical elements are disposed downstream of at least the first optical element 10 in the light-guiding direction and provided separately from the first optical element 10. These further optical elements 30, 40 interact with the first optical element 10 and preferably with the second optical element 20 and further optical elements 30 (preferably disposed upstream thereof) in order to obtain a desired closed light guidance. Here, the light guidance through the lens arrangement 1 need not lead through each optical element 10, 20, 30, 40 for each light ray. By way of example, it is also conceivable for the light to be guided in the individual optical elements 10, 20, 30, 40 in such a way that, for example, some of the light is guided from the first optical elements 10 into the second optical element 20 and some more light is guided into the third optical element 30 from the first optical element 10, either directly or by way of the second optical element 20, and/or some of the light is emitted by the second optical element in the main emission direction H and some more is guided into the third optical element 30, from where the light is likewise emitted in the main emission direction H, for example in order to obtain a homogeneous light emission or a defined characteristic light emission.

The longitudinal axes L2, L3, L4 of the optical elements 10, 20, 30, 40, preferably at least the longitudinal axes L2, L3 of the first optical element 10 and the second optical element 20, are preferably aligned parallel to one another. For reasons of clarity, the longitudinal axes L1, L2, L3 are depicted in a combined manner in FIG. 1. In FIG. 8, the longitudinal axes L1, L2, L3, L4 are depicted in an exemplary manner in a plan view. By way of example, in the case in which at least the longitudinal axes L2 and L3 of the first two optical elements 10, 20 are aligned parallel to one another, it is possible, as depicted in FIG. 1, for the first optical element 10 to be securely held in a recess 21 of the second optical element 20. The same applies to all optical elements 10, 20, 30, 40 in conjunction with other adjacent optical elements 10, 20, 30, 40.

Alternatively, or additionally, it is also conceivable for at least one of the longitudinal axes L2, L3, L4, preferably for one of the longitudinal axes L4 of the further optical elements 30, 40, to be aligned obliquely or transversely by a predetermined angle in relation to the other longitudinal axis or axes L2, L3, L1 in a plane perpendicular to the main emission direction H of the lens arrangement 1 (i.e. the main plane of the extent of the lens arrangement 1). In this case, the optical elements can, for example, be arranged across one another; referring to FIG. 3, it is possible, for example, for the third optical element 30 to be provided across the second optical element 20 if this is desired for defined light emission, depending on the application.

The optical elements 10, 20, 30, 40, preferably light-entrance regions 23, 33, 43 of the second optical element 20 and the further optical elements 30, 40, are preferably at least partly in (planar) contact with other optical elements, preferably the light-exit or light-emission regions 14, 24, 34 of at least one of the optical elements 10, 20, 30 disposed upstream thereof in the light-guiding direction in order to easily position and set the optical elements 10, 20, 30, 40 in relation to one another and, preferably, to continue the light guidance of the first optical element 10 and, in accordance with the light-guiding direction, further optical elements 20, 30 disposed upstream thereof in the desired manner.

In order to connect the optical elements 10, 20, 30, 40 in a defined manner and position them in relation to one another, the optical elements 10, 20, 30, 40 preferably have connection elements (not shown here) which mechanically correspond to one another. By way of example, these connection elements can be embodied in the form of rails or guides such that the individual optical elements can be inserted into one another and aligned with respect to one another; consequently, optical adjacent elements are therefore positionable in a manner adapted to one another. For exact positioning of the optical elements in relation to one another, provision can also be made, for example, of latching elements. Alternatively, or additionally, the connection elements can also have studs, pins and the like, and the respectively corresponding receiving elements. Preferably, the optical elements 10, 20, 30, 40 are connected to one another in a non-destructive detachable manner.

At least one of the optical elements 10, 20, 30, 40, preferably at least the second optical element 20 and/or the further optical elements 30, 40, has a recess 21 which extends along the longitudinal direction of the optical element 10, 20, 30, 40, preferably over the whole length thereof, for receiving a further optical element 10, 20, 30, 40, preferably the first optical element 10 or another optical element 20, 30 disposed upstream in the light-guiding direction.

Preferably, at least one optical element 10, 20, 30, 40, particularly preferably the last optical element in the light-guiding direction, can have a protection element 25, preferably embodied integrally with the optical element 10, 20, 30, 40, for protecting the illuminant or a luminaire L comprising the lens arrangement 1 (see FIG. 8) against contamination and contact. As can be gathered from e.g. FIG. 6, this protection element 25 can, for example, present a wall element extending on the rear side from the corresponding (last) optical element 20 against the main emission direction H, which wall element may be provided with e.g. latching elements (e.g. latching lugs) 26, which, when the lens arrangement 1 is brought together, latch with e.g. a part or plate element of the first optical element 10 or the printed circuit board 3 having the illuminants 2 or else a part (e.g. housing 4, see FIG. 8) of the luminaire L. Hence, by means of the latching elements 26 and, corresponding therewith, the latching elements of another optical element, the printed circuit board 3 or another part of the luminaire L, the lens arrangement 1 or the luminaire L or parts thereof can be mechanically connected or kept together and preferably also be aligned in relation to one another.

In the case of an embodiment of the first optical element 10 as a plate, it preferably has discrete lenses or lens elements as light-entrance regions 11, as can be gathered from FIG. 6 if, in place of the shown printed circuit board 3, a plate-like first optical element 10 is received and the printed circuit board 3 would then be provided on the rear side thereof. Then, such a protection element 25 can, as described above and shown in FIG. 6, simultaneously serve as connection element of the type described above, wherein e.g. receptacles for the latching lugs 26 are provided in the first optical element 10 or in the printed circuit board 3 for the purposes of accurately positioning the optical elements 10, 20 in relation to one another or in relation to the printed circuit board 3. As already mentioned, the optical elements 10, 20, 30, 40 can be embodied with protection elements 25 as desired in order to provide corresponding protection against contamination and contact and, optionally, to serve as a connection element to other optical elements 10, 20, 30, 40 or parts of the luminaire L.

Particularly preferably, the protection element extends over the whole length of the corresponding optical element in order thereby preferably to form a (laterally) closed and therefore outwardly delimited and protected lens arrangement 1 or luminaire L.

Depending on the application specifications, the optical elements 10, 20, 30, 40 can be selectively embodied as linear lens elements, in particular extrusion lenses, lens arrays, in particular plates with discrete lenses or lens elements, lattice or grid elements, MPO or COP plates, diffractive optical units and/or freeform optical units, wherein different lens forms of the optical elements 10, 20, 30, 40 are also combinable amongst themselves as required. Since the respective optical elements 10, 20, 30, 40 have different objects, they can consequently also be provided in a proportion deviating from a 1:1 relationship.

Such a lens arrangement 1 renders it possible to embody large and, above all, long stacks in such a way that the thermal influences on the optical unit overall are minimized, which in turn leads to reduction in the collision risk between the illuminants 2 and the optical unit, and to a stabilization of the emission characteristic for certain temperature limits. Furthermore, the different stages 10, 20, 30, 40 of the lens arrangement 1 or of the optical unit render it possible to realize complex optical geometries which cannot be provided or produced by e.g. single-stage optical units because they otherwise may not be demoldable. In this respect, reference is made in an exemplary manner to FIG. 5 which, on the left-hand side, shows a single-stage split lens and, on the right-hand side, shows a two-stage split lens 1 according to the invention, wherein it is already possible to identify on the basis of the emission characteristic how the advantageous two-part embodiment is positively noticeable in view of homogeneous light scattering. Moreover, the embodiment of the lens arrangement 1, depicted on the right-hand side, would not be possible as a single component since it is not (easily) demoldable.

FIG. 8 shows, for example, a further embodiment according to the invention of the elongate multipartite lens arrangement 1. In the embodiment shown in FIG. 8, it is possible to see a three-stage lens arrangement 1 which, in addition to the first optical element 10 and the second optical element 20, has a further, third optical element 30. Furthermore, FIG. 8 shows a corresponding illuminant 2, which is preferably applied to an (elongate) printed circuit board 3. As depicted in e.g. FIG. 8, the first optical element or elements 10 can be provided directly on the printed circuit board 3 or the housing 4 in a detachable or non-detachable manner. It is therefore also conceivable for both the lens arrangement 1 and the illuminant 2 or the printed circuit board 3 to be received e.g. by way of a housing 4 in the luminaire L and to be positioned relative to one another.

The luminaire L according to the invention therefore has a multiplicity of illuminants 2 and an elongate multipartite or multi-stage lens arrangement 1 according to the invention, wherein no, one or more illuminants 2 are assigned in a defined optical manner to each one of the light-entrance regions 11—in particular to the light-entrance regions of the first optical elements 10. If, furthermore, provision is made of a separate housing 4 of the luminaire L, the lens arrangement 1 overall, preferably the last optical element or elements in the light-guiding direction, can form a cover of the luminaire L or of the housing 4, as shown in FIG. 8.

However, it is also conceivable for the housing 4 receiving the lens arrangement 1 or the illuminant 2 to be sealed by means of a separate cover, which preferably has light-influencing (e.g. light-scattering) properties.

The protection element 25 shown previously in FIG. 6 can provide the space I, spatially closed off to the outside, for protecting the luminaire L or the illuminant 2, either on its own or else in connection with the housing 4 or the printed circuit board 3. To this end, a possibly provided latching element 26 of the protection element 25 preferably interacts with a corresponding latching element of the lens arrangement 1 or of the luminaire L or with part of same for mechanically connecting or keeping together the lens arrangement 1 or the luminaire L.

At least the last optical element 20, 30, 40 in the light-guiding direction can, as seen in the direction of the longitudinal axis L3, L4, have substantially the same length as the housing 4 or the luminaire L or the printed circuit board 3 having the illuminant. To this end, at least the last optical stage 20, 30, 40 of the multipartite stacked lens arrangement 1 can be embodied e.g. as an extrusion lens, as a result of which a closed and protected optical system can be provided very easily.

A type of contact protection for the electrical components (e.g. illuminant or LED 2) can be provided in a simple manner, particularly in the case in which at least one of the optical elements or stages 10, 20, 30, 40 is applied directly to the printed circuit board 3. It can likewise, in an alternative or additional manner, be provided by the above-described protection elements 25 or else by the housing 4 of the luminaire L itself. The subsequent stage or stages can then serve as partial or complete cover for the luminaire L.

In particular, light-emitting diodes (LED) are used as illuminants 2, with the invention not being restricted to such illuminants.

The features of the exemplary embodiments described above are combinable with one another as desired within the scope of the invention. Thus, the invention is e.g. not restricted to a number or positioning or embodiment of the individual optical elements 10, 20, 30, 40 for as long as these are provided separately and interact optically with one another in such a way that they enable closed light-guidance of at least some of the light emitted by the illuminant 2. Also, the light guided by the optical elements 10, 20, 30, 40 need not pass through all optical elements 10, 20, 30, 40, but, depending on application, at least some can also only pass through one or some of the optical elements 10, 20, 30, 40, as depicted in an exemplary manner in FIG. 5.

Moreover, neither the optical elements 10, 20, 30, 40 nor the housing 4 or any other component is restricted to specific materials. In respect of the optical elements, reference is made to the fact that these can preferably be made of PMMA and/or PC, wherein optical elements 10, 20, 30, 40 made of any materials can be combined with one another as required. Therefore, combinations with other known optical materials, such as e.g. various types of glass, are also conceivable in this context.

In respect of the embodiment of the optical elements or optical stages 10, 20, 30, 40, it is furthermore observed that these can have any desired (preferably known) form, which, depending on application, can be combined with one another in a different expedient way and as desired.

As can be gathered from e.g. FIG. 5 as well, the further optical elements 20, 30, 40, in addition to the first optical element 10, can also have a recess or a direct light-entrance region 23, 33, 43 for receiving an illuminant 2 or at least for introducing the light emitted by the illuminant 2 into the lens arrangement 1.

As can likewise be gathered from FIG. 5, each further optical element 20, 30, 40, in addition to the first optical element 10, can also have comparable light-entrance regions 11, 23, 33, 43 with comparable features, to which the illuminants 2 can likewise be directly assigned and by means of which light from the illuminant 2 can be introduced directly into the lens arrangement 1.

The invention claimed is:

1. An elongate multipartite lens arrangement for luminaires (L) for influencing light emitted by an illuminant comprising:
    a first elongate optical element comprising a first longitudinal axis (L2) and at least one second elongate optical element comprising a second longitudinal axis (L3), which second elongate optical element is disposed downstream of the first optical element in a light-guiding direction and provided separately from the first optical element,
    wherein at least the first optical element has at least one defined light-entrance region, provided along the first longitudinal axis (L2), for introducing light of the illuminant into the lens arrangement
    wherein the second optical element, for the purposes of guiding light of the lens arrangement, optically interacts with the first optical element in order to continue the light guidance of the first optical element,
    wherein the light-entrance region is embodied as a recess for receiving the illuminants, and
    wherein the first optical element has a grid or lattice forming the light-entrance regions, and at least one illuminant is assignable to each light-entrance region.

2. The elongate multipartite lens arrangement as claimed in claim 1, furthermore comprising one or more further elongate optical elements, which are disposed downstream at least of the first optical element in the light-guiding direction and provided separately from the first optical element and the second optical element, each further elongate optical element comprising a longitudinal axis (L4), wherein the further optical elements optically interact with the first optical element, with the second optical element and other further optical elements, for light-guiding purposes in order to obtain a desired, closed light guidance of the lens arrangement.

3. The elongate multipartite lens arrangement as claimed in claim 1, wherein the longitudinal axes (L2, L3, L4) of the optical elements, at least of the first optical element and second optical element, are aligned parallel to one another or wherein at least one of the longitudinal axes (L2, L3, L4), is aligned obliquely or transversely by a predetermined angle in relation to the other longitudinal axis or axes (L2, L3, L4) in a plane perpendicular to a main emission direction of the lens arrangement.

4. The elongate multipartite lens arrangement as claimed in claim 1, wherein the light-entrance regions are embodied as optical light-influencing elements, in particular as lenses, or have light-influencing elements.

5. The elongate multipartite lens arrangement as claimed in claim 1, wherein the optical elements, at least the light-entrance regions of the second optical element and of the further optical elements, are at least partly in planar contact with other optical elements, light-exit regions of at least one of the optical elements disposed upstream thereof in the light-guiding direction.

6. The elongate multipartite lens arrangement as claimed in claim 1, wherein the optical elements have connection elements, which correspond mechanically to one another, for defined connecting and positioning of the optical elements in relation to one another, wherein the connection elements have rails, guides, studs, pins and corresponding receiving elements.

7. The elongate multipartite lens arrangement as claimed in claim 1, wherein at least one of the optical elements has a recess which extends in the longitudinal direction of the optical element, over the whole length thereof, for receiving a further optical element.

8. The elongate multipartite lens arrangement as claimed in claim 1, wherein at least the last optical element in the light-guiding direction, has a protection element embodied integrally with the optical element, for protecting the illuminant or a luminaire (L) comprising the lens arrangement, wherein the protection element has latching elements for mechanically connecting or keeping-together the lens arrangement or a luminaire (L) comprising the lens arrangement.

9. The elongate multipartite lens arrangement as claimed in claim 1, when the optical elements are embodied as linear lens elements, in particular extrusion lenses, lens arrays, in particular plates with discrete lenses or lens elements, lattice or grid elements, MPO or COP plates, diffractive optical units, freeform optical units, and/or as diffusely scattering plates, wherein the respective optical elements have a complex geometry when seen in a cross section.

10. A luminaire (L), comprising a multiplicity of illuminants and an elongate multipartite lens arrangement as claimed in claim 1, wherein no, one or more illuminants are optically assigned in a defined manner to each one of the light-entrance regions.

11. The luminaire (L) as claimed in claim 10, furthermore comprising:
    a housing for receiving the illuminants and
    the lens arrangement, wherein the last elongate optical element or elements in the light-guiding direction, form a cover of the luminaire (L) or of the housing.

12. The luminaire (L) as claimed in claim 10, wherein the illuminants are attached to an elongate printed circuit board, wherein, the first optical element or elements is/are provided directly on the printed circuit board or the housing in a detachable or non-detachable manner.

13. The luminaire (L) as claimed in claim 10, wherein a protection element, either on its own or in conjunction with a housing or a printed circuit board, provides a space, which is spatially closed to the outside, for the purposes of protecting the luminaire (L) or the illuminant, wherein a latching element interacts with a corresponding latching element of the lens arrangement or of the luminaire (L) for mechanically connecting or keeping together the lens arrangement or the luminaire (L).

14. The luminaire (L) as claimed in claim 10, wherein the last optical element in the light-guiding direction, substantially has the same length, as seen in the direction of the longitudinal axis (L1) of the lens arrangement, as a housing, the illuminant, or a printed circuit board comprising the illuminant.

15. The luminaire (L) as claimed in claim 10, wherein the illuminants comprise light-emitting diodes.

* * * * *